Sept. 9, 1969  R. M. KRAMER  3,465,855
AUTOMATIC ADJUSTER FOR A DISC BRAKE
Filed Jan. 2, 1968  2 Sheets-Sheet 2
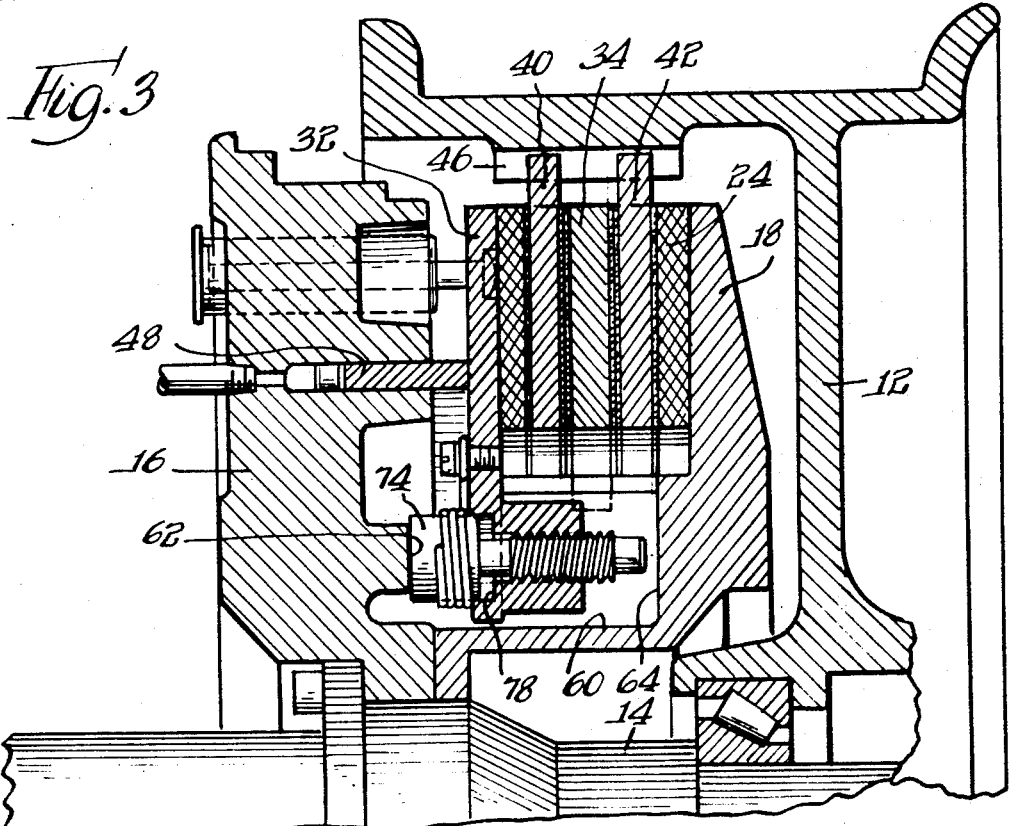
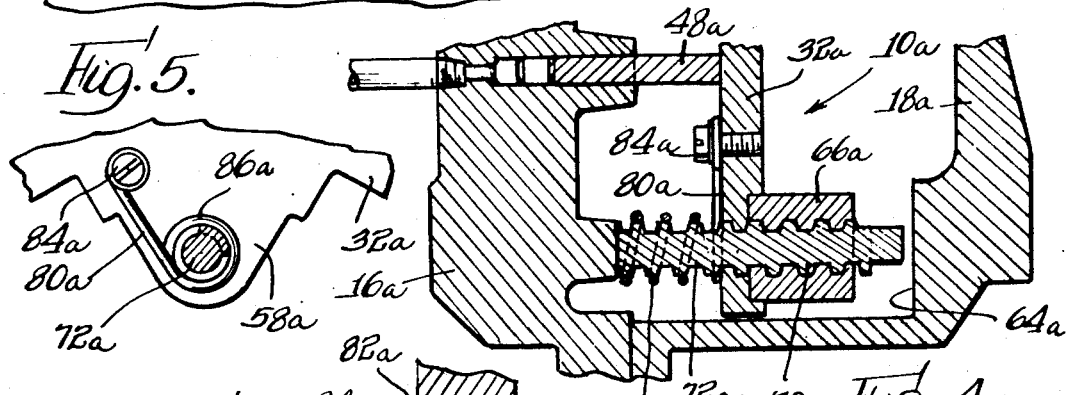
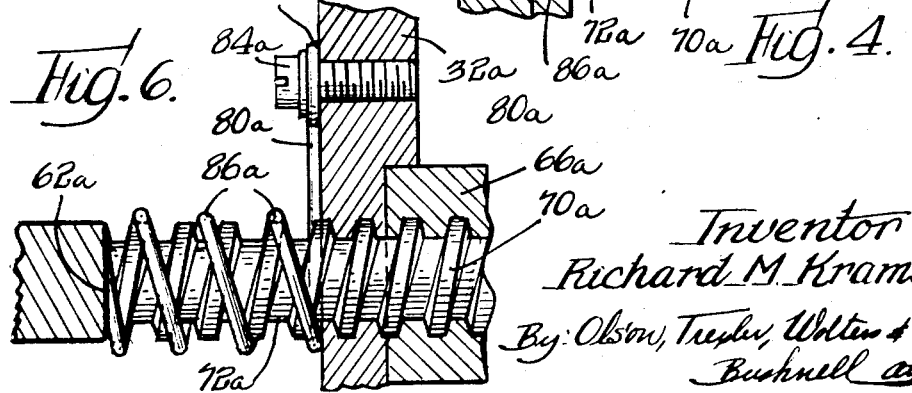
Inventor
Richard M. Kramer
By: Olson, Trexler, Wolters &
Bushnell Attys.

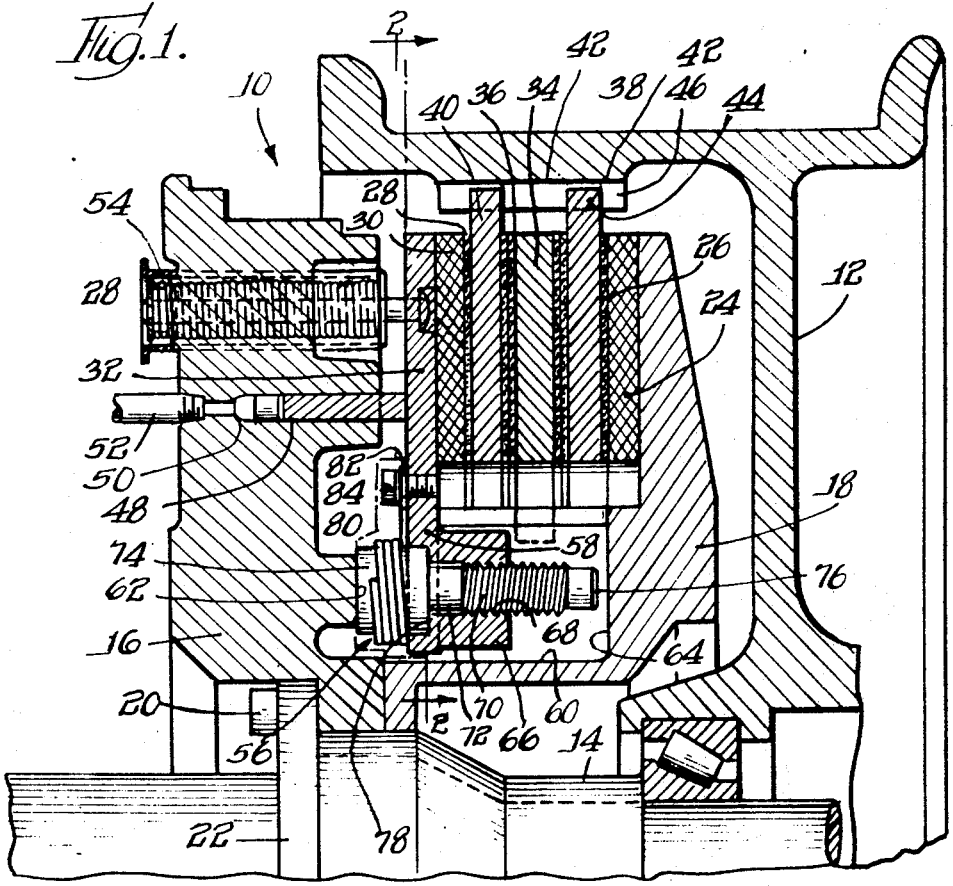

3,465,855
AUTOMATIC ADJUSTER FOR A DISC BRAKE
Richard M. Kramer, Stevensville, Mich., assignor, by mesne assignments, to Lambert Brake Corporation, St. Joseph, Mich., a corporation of Michigan
Filed Jan. 2, 1968, Ser. No. 695,232
Int. Cl. F16d 65/52, 55/14
U.S. Cl. 188—196                    6 Claims

ABSTRACT OF THE DISCLOSURE

There is disclosed an automatic adjuster mechanism for a disc brake comprising a screw threadedly engaging and carried by an axially shiftable stator member and engageable with an abutment for limiting return movement of the stator member. A spring having one end anchored and an opposite end wound round the screw is provided for gripping and locking the screw against retrograde rotation and releasing the screw for adjusting rotation during energizing of the brake.

---

The present invention relates to a novel adjuster mechanism for a brake, and more specifically to a novel automatic adjuster especially suitable for use in disc brakes.

An important object of the present invention is to provide a novel adjuster mechanism for compensating for wear in disc brakes and the like, said mechanism having a shiftable element responsive to oppositely directed forces during deenergizing and release of the brakes and means for increasingly gripping and locking the element against movement upon the energizing of the brake and for releasing the element to permit movement thereof during energizing of the brake.

A more specific object of the present invention is to provide a novel automatic adjuster mechanism for disc brakes and the like and comprising an adjustable screw member carried by an axially shiftable stator member and having opposite ends engageable with a first abutment surface during energizing of the brake and a second abutment surface when the brake is deenergized, said engagement tending to cause rotation and axial adjustment of the screw member, and said mechanism further including spring means engaging said screw member for progressively increasingly gripping and locking the screw member when the brake is deenergized and for releasing the screw member when the brake is energized.

Other objects and advantages of the present invention will become apparent from the following description and the accompanying drawings wherein:

FIG. 1 is a fragmentary partial sectional view showing a disc brake structure including an automatic adjusting mechanism incorporating features of the present invention associated with a wheel;

FIG. 2 is a fragmentary sectional view taken generally along line 2—2 in FIG. 1;

FIG. 3 is a fragmentary sectional view similar to FIG. 1 and showing the relationship between certain parts after adjustment has occurred;

FIG. 4 is a fragmentary sectional view showing a modified form of the present invention;

FIG. 5 is a fragmentary sectional view taken along line 5—5 in FIG. 4; and

FIG. 6 is an enlarged fragmentary partial sectional view showing the modified form in greater detail.

Referring now more specifically to the drawings wherein like parts are designated by the same numerals throughout the various figures, a brake unit 10 incorporating features of the present invention is shown in FIGS. 1–3 associated with a wheel 12 suitably mounted on a fixed axle 14. An annular end member or power plate 16 and a complementary annular opposite end member or backup plate 18 are secured together and around the axle 14 by suitable means such as screws 20 extending through a radially projecting flange 22 on the axle.

An annular disc 24 of brake lining material is secured to the end plate 18 for providing a first stationary friction surface 26 and an oppositely disposed friction surface 28 is provided by another annular disc 30 of friction material which is secured to a primary annular stator member 32 adjacent the end plate 16. The stator member 32 has an inner margin formed with flutes 34 for engaging splines 36 on the member 18 as shown in FIG. 2. The construction is such that the stator member 32 is locked against rotation but is axially shiftable during operation of the brake. Another intermediate stator member 34 having opposite facings 36 and 38 of brake lining material may be provided if desired. This stator member also is provided with suitable flutes at its inner margin for cooperative engagement with the splines 36. Between the aforementioned stator members and the backup plate friction surface are rotors 40 and 42. The rotors may also have their opposite sides faced by brake lining material, if desired. Peripheral margins of the rollers are formed with flutes 44 for cooperative engagement with splines 46 on the wheel 12 whereby the rotors are adapted to rotate with the wheel while being axially shiftable relative thereto during operation of the brake as described below.

In order to energize the brake, suitable means is provided for axially biasing the primary stator member 32 toward the backup plate for clamping the intermediate stator and rotor discs therebetween. In the embodiment shown, this means comprises an annular piston 48 engageable with the stator member 32 and disposed in an annular cylinder 50 formed in the power plate or end member 16. The cylinder 50 is connected to a suitable source of fluid under pressure by a conduit 52. Return spring assemblies 54 such as those shown in U.S. Patent 3,010,543 are connected between the power plate and the primary stator disc for returning the stator disc to the fully retracted position shown in FIG. 1 in order to release the brake when the pressure of the actuating fluid in the cylinder 50 is relieved. A return spring assembly 54 is shown generally in FIG. 1 and for a more detailed disclosure reference is made to the aforementioned patent.

As will be understood, there are small running clearances between the friction surfaces of the rotor and stator members when the brake is new and the primary stator disc is in its fully retracted or deenergized position. Of course, the friction surfaces gradually wear away after repeated operations on the brake so that these running clearances tend to increase. This increases the amount or distance which the primary stator disc must be moved to energize the brake and thus slows down brake response. In order to adjust the fully retracted or deenergized position of the primary stator disc in accordance with wear for maintaining the running clearances within desired limits, an adjuster mechanism 56 is provided as shown in FIGS. 1–3.

The adjuster mechanism comprises a radially inwardly extending section or ear 58 integral with the primary stator disc 32 and projecting into a cavity 60 in the members 16 and 18. One end of the cavity is defined by an abutment surface 62 on the member 16 and an opposite end of the cavity is defined by an abutment surface 64 on the member 18.

An elongated boss 66 is welded or otherwise secured to or formed integrally with the ear 58 and projects axially within the cavity. The boss is formed with an internally threaded bore 68 which receives a threaded shank 70 of a screw 72. In this embodiment the screw has an enlarged head 74 engageable with the abutment surface 62 and positively limiting return movement of the primary stator disc 32 or, in other words, for positively locating the primary stator disc in a deenergized position. An opposite end 76 of the screw is engageable with the abutment surface 64 during operation of the brake as described below. FIG. 1 shows the brake when the friction surfaces thereof are new and with the adjuster screw 72 at a fully retracted position with the head thereof in engagement with an end surface 78 of the boss 66.

The total of the running clearances between the friction surfaces is correlated with the clearances between the end 76 of the adjuster screw and the abutment surface 64. The arrangement is such that when the brake is energized, the primary stator member 32 is moved toward the right as viewed in FIG. 1 until the various rotor and stator discs are effectively clamped between the opposite end friction surfaces 26 and 28. At the same time the adjuster screw 72 is carried toward the right with the primary disc. As the friction surfaces are worn, the primary stator disc and the screw 72 move an increasing distance toward the right. This ultimately causes the end 76 of the screw to be urged against the abutment surface 64. The threads of the screw 72 have a sufficiently long lead so that the axial reaction force which is created when the screw is urged against the abutment surface causes the screw to rotate in a direction for extending the screw rearwardly or toward the left as viewed in FIG. 1 relative to the disc 32. Such a rearward extension or adjustment of the screw is shown in FIG. 3. As a result of this extension or adjustment of the screw, the subsequent return or deenergized position of the stator disc 32 is adjusted because of the engagement of the screw head with the abutment surface 62 for maintaining the desired running clearances.

In accordance with a feature of the present invention, the adjuster mechanism is provided with means for normally gripping the screw and preventing accidental or undesired rotation and adjustment thereof when the brake is not in operation and for automatically releasing the screw when the screw tends to rotate in one direction upon being thrust against the abutment surface 64 during energizing of the brake. The screw retaining means is also adapted to grip the screw and prevent rotation thereof with increasing aggressiveness when the screw head is urged against the abutment surface 62 by the return spring means 54.

In this embodiment, the means for gripping the screw comprises a wire spring 80 having one end 82 anchored to the back of the primary stator disc 32 by a pin or screw 84. An opposite end of the spring is coiled into a plurality of right-hand helical convolutions 86 having a diameter normally slightly less than the diameter of the head 74 and snugly embracing and gripping the head 74. The frictional and resilient gripping action of the spring convolutions 86 effectively prevents the screw from rotating when the brake is not in operation.

The thread convolutions on the screw shank 70 have a left-hand formation in the embodiment shown or, in other words, of the opposite hand from the spring convolutions 86. When the end 76 of the screw is thrust against the abutment surface 64 during operation of the brake, the axial thrust tends to rotate the screw in a clockwise direction as viewed in FIG. 2 for extending the screw. When the screw tends to rotate in this direction, the frictional engagement between the screw head and the spring tends to unwind the spring coils 86. This action causes the coils 86 to be expanded or to increase in diameter so that their gripping action is effectively released and the screw is free to rotate for obtaining the desired adjustment. However, when the brake is deenergized and the return spring means 54 retracts the primary actuator disc 32 and aggressively urges the screw head 74 against the abutment or stop surface 62, the axial thrust on the screw tends to rotate it in a counterclockwise direction as viewed in FIG. 2. The screw head then tends to wind the spring convolutions 86 tighter so that there is a tendency for the diameter of the spring convolutions to be decreased with the result that the spring convolutions tightly grip the screw head to prevent rotation thereof. In other words, as the thrust of the screw against the abutment surface 62 is increased the gripping action of the spring convolutions 86 is increased for effectively preventing undesirable rotation of the screw.

FIGS. 4–6 show a slightly modified form of the present invention which is essentially identical to the structure described above as indicated by the application of identical reference numerals with the suffix a added to corresponding elements. In this embodiment the enlarged head portion of the screw has been omitted and the threaded shank has been extended for engagement with the abutment surface 62a. In addition, the coils 86a of the spring 80a are formed with a pitch of about the same length as the pitch of the screw threads. This arrangement insures gripping engagement of the spring coils with the peripheries of the screw threads and prevents the coils from becoming wedged between flanks of adjacent thread convolutions.

The invention is claimed as follows:

1. In a brake having means providing opposite end members fixedly mountable adjacent a rotatable member to be controlled, rotor means including a rotor disc disposed between said opposite end members and connectable with said rotatable member, stator means disposed between one of said end members and said rotor means, and means for axially advancing said stator means in one direction for energizing the brake and for retracting the stator means in an opposite direction for deenergizing the brakes, an adjuster mechanism comprising an adjuster screw carried by and threadedly engaging said stator means and having first and second oppositely projecting end portions, a fixed abutment engageable with said first end portion for limiting return movement of said stator means, another fixed abutment engageable with said second end portion when said stator means advances in excess of a predetermined distance during energizing of the brake for rotating said screw in one direction for axial adjustment relative to the stator means for adjusting the return movement of the stator means, and means carried by said stator means and engaging and retaining said screw against rotation and responsive to rotation of said screw in said one direction of rotation for releasing the screw and also responsive to any rotation of the screw in a direction opposite to one said direction of rotation for increasingly aggressively engaging said screw and locking it against said last mentioned rotational movement.

2. An adjuster mechanism, as defined in claim 1, wherein said means for engaging and retaining said screw comprises a spring having one end anchored to said stator means and a helical coil portion surrounding and gripping said screw.

3. An adjuster mechanism, as defined in claim 2, wherein said screw has thread convolutions of one hand and said spring coil portion is of an opposite hand.

4. An adjuster mechanism, as defined in claim 3, wherein said spring coil portion includes a plurality of helical convolutions normally having an internal diameter slightly less than an external diameter of a part of the screw engaged thereby.

5. An adjuster mechanism, as defined in claim 4, wherein said part of the screw engaged by said spring convolutions comprises an enlarged head.

6. An adjuster mechanism, as defined in claim 4, wherein said spring convolutions engage a threaded portion of said screw, and said spring convolutions and the screw threads having a substantially equal pitch.

References Cited

UNITED STATES PATENTS

| 3,244,260 | 4/1966 | Frayer | 188—196 |
| 3,280,945 | 10/1966 | Spalding | 188—196 |
| 3,357,522 | 12/1967 | Bradley et al. | 188—73 |

DUANE A. REGER, Primary Examiner

U.S. Cl. X.R.

188—72